Nov. 29, 1960 R. E. FRICKS 2,962,549

METHOD AND APPARATUS FOR GENERATING FACSIMILE SIGNALS

Filed March 30, 1955

Inventor
Richard E. Fricks
by Roberts, Cushman & Grover
att'ys.

United States Patent Office 2,962,549

Patented Nov. 29, 1960

2,962,549

METHOD AND APPARATUS FOR GENERATING FACSIMILE SIGNALS

Richard E. Fricks, Bedford, Mass., assignor to Alden Products Co., Brockton, Mass., a corporation of Massachusetts Filed Mar. 30, 1955, Ser. No. 497,893

8 Claims. (Cl. 178—7.1)

This invention relates to art of generating electrical signals representative of scanned copy material such as pictures or printed matter, and particularly to a novel method and apparatus for improving the synchronizing characteristics of the signals.

Facsimile signals customarily include a portion corresponding to an elemental line of the copy material and a framing or similar sync pulse. When such signals are to be used in an electrolytic recording system they should increase in amplitude toward a predetermined limit as the copy material scanned increases in blackness for the reason that as the signals increase in amplitude toward the black limit or level there will be electrolytically deposited on the recording paper a black record. Moreover the sync pulse, which must be greater in amplitude than the picture signals in order to distinguish it from the picture signals, must therefore be in effect blacker than the blackest picture signal. It has been found extremely difficult to generate a blacker than black sync pulse for the reason that light cannot be reduced below the black level.

Accordingly one object of the present invention is to provide a way of producing the facsimile signal composed of a picture portion and a blacker than black sync pulse. A further object is to provide an improved circuit for amplifying the picture and sync signals and for maintaining a predetermined time relation between the picture and sync signals.

In one aspect the invention comprises the method of amplifying the picture portion, separately modifying the sync pulse and then combining the amplified picture portion and modified sync pulse in black phase, that is to say so that the sync pulse increases in amplitude in the same direction as the black picture signals, but yet is distinguishable from the blackest picture portion. Preferably the sync pulse is amplified to the extent that it is greater in amplitude than the blackest picture portion. Since the sync pulse and picture portions are amplified separately the picture portions may be modified by clipping and squaring so that the combined composite facsimile signal includes a clearly distinguishable sync pulse and picture signals which are most suitable for electrolytic recording.

In another aspect the method involves the preliminary step of generating a facsimile signal which includes a picture portion in black phase, that is with the highest amplitude signals representing black portions of the copy, and a sync pulse in white phase.

While the essence of the present invention is clearly defined as a method I also provide a novel circuit and apparatus for producing the desired composite facsimile signals. In one aspect the invention involves a circuit for amplifying facsimile signals which include a white sync pulse and comprises an input terminal for the signals, a first channel connected to the input terminal, the channel including an amplifier of the facsimile signals, a second channel connected to the terminal including a stage responsive to the sync pulse only and an amplifier of the sync pulse, and a signal mixer which is connected to both of the aforesaid channels and is operative to combine the amplified pulse in black phase with the amplified signals. Because the sync pulse is treated separately in the second channel, the first channel may include a shaper for reforming a facsimile signal prior to combining them to the amplified sync pulse. By the same token the second channel may include a stage for modifying the sync pulse in a different manner than the facsimile signals, for example a stage for artificially delaying the sync pulse in time.

In a still further aspect the invention involves a generator of signals which includes means forming a white sync pulse as well as black picture signals. More particularly the signal generator comprises a light modulated, photoelectric scanner including a drum having a helical window for passing light which generates black picture signals, the ends of the helical window terminating in a common longitudinal zone of the drum, and a second window of greater width than said helical window and located at least in part in the foresaid zone. The second window being of greater width therefore passes increased light and causes the photoelectric scanner to generate a whiter than white sync pulse at times between the times that the picture signals are generated.

For the purpose of illustration typical embodiments of the invention are shown in the accompanying drawings in which Fig. 1 is a schematic diagram illustrating a method of and apparatus for generating facsimile signals;

Figures 2, 3, 4:
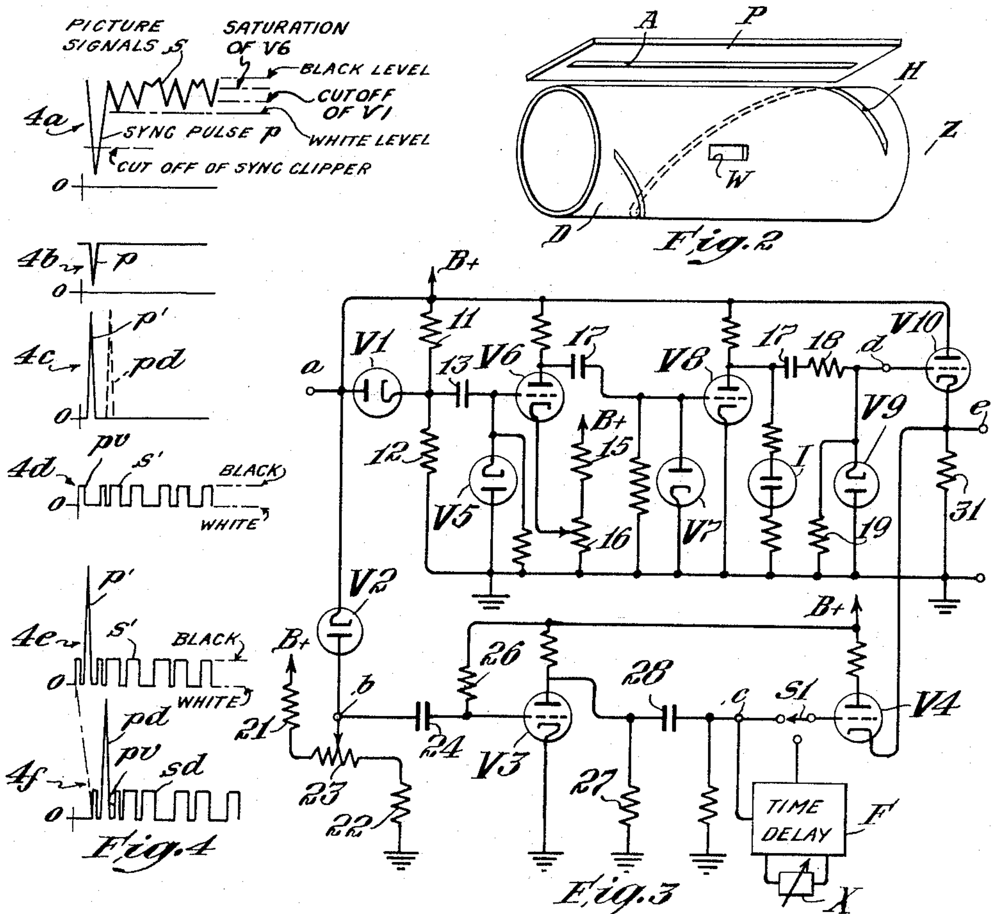
Fig. 2 is an isometric view showing diagrammatically scanning apparatus for generating a signal according to the present invention.
Fig. 3 illustrates signal voltages generated according to the invention.
Fig. 4 is a schematic diagram of a circuit for amplifying facsimile signals.

As shown at 4*a* of Fig. 4 of the drawings the initial facsimile signal generated according to the present invention comprises picture signals *s* and a sync pulse *p*. The picture signals vary in amplitude between a white level and a black level, the black signals being greater in amplitude with reference to the zero coordinate than the white level. The polarity of these signals may be either positive or negative, however, for the purpose of illustration they are assumed to be positive. The sync pulse *p* extends beyond the white level toward the zero level, thus distinguishing it from the picture signals and enabling a portion of it to be separated from the composite facsimile signal. The portion which extends below an arbitrary level labelled Cut Off of Sync Clipper is shown separated from the facsimile signal at 4*b* of Fig. 4. This portion is amplified and inverted and appears as an amplified pulse *p'* at 4*c* of Fig. 4. At the same time that the sync pulse is clipped and amplified the picture signals *s* are amplified and preferably shaped so that they vary sharply between black and white levels, as shown at 4*c* of Fig. 4. The amplified sync pulse *p'* is then combined with the amplified picture signals *s'* to form a final signal 4*e* in which the sync pulse increases in amplitude beyond the black level and thus, in terms of amplitude, is blacker than the black level. In contrast with the initial facsimile signal 4*a*, wherein the sync pulse is greatest in amplitude beyond the white level, i.e. whiter than white, the sync pulse *p'* of the final signal produced according to the present invention is blacker than black and hence is particularly well suited for application to an electrolytic recorder wherein the picture signals of highest amplitude represent black portions of the picture.

In certain cases amplification of the picture signals may delay the picture signals relative to the sync pulse so that in the output facsimile signal the sync pulse will not bear the proper time relation to the picture signals. However, because the sync pulse is, according to the present invention, separated and amplified separately from the picture signals it is possible to delay the sync pulse intentionally for the same period that the picture signals are unavoidably delayed. Thus as shown at 4*c* of Fig. 4 the sync pulse *pd* has been delayed by an amount such that when combined with delayed picture signals *sd*, as shown at 4*f*, the sync pulse bears the same time relation to the picture signals as does the undelayed sync pulse *p'* to the undelayed signals *s'* in the facsimile signal 4*e* of Fig. 4.

Figure 1:
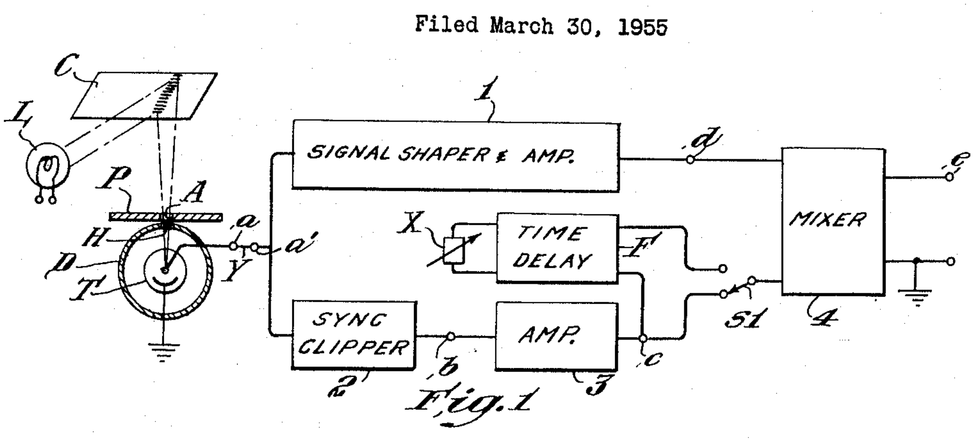

While the initial facsimile signal 4*a* may be generated in various copy scanning devices, a preferred, novel device is illustrated in Figs. 1 and 2, and includes a lamp L illuminating copy C which is fed through the scanner. Light reflected from the copy is masked by a plate P having a narrow aperture A which passes light from only a thin line of the copy. Between the masking plate P and a phototube T is a rotating drum D having a helical window H which may be a translucent portion of an otherwise opaque drum, or a slit in the drum. As is well known to the art, rotation of the drum effectively scans along the line of copy admitted through the aperture A causing the phototube T to generate the the picture signals *s* of Fig. 4*a*.

According to the present invention a whiter than white sync pulse is generated by providing a window W through the drum D in the zone Z in which the ends of the helical aperture H terminate. The window W is wider transversely of the zone Z than the helical aperture and hence admits a pulse of light of greater intensity than can be admitted through the narrow helical aperture. Receiving a flash of light wider than that reflected from white portions of the copy C through the helical window H the phototube T will generate a pulse which extends beyond the white level. As shown in Fig. 2 the ends of the helical window H terminate along a very narrow zone indicated by the broken line Z. In this case the window W extends outside the zone Z.

Figure 5:
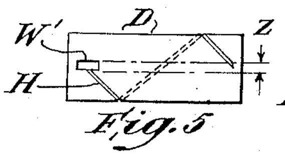
Figs. 5 and 6 are elevations showing modification scanning drum shown in Fig. 2.
Figure 6:
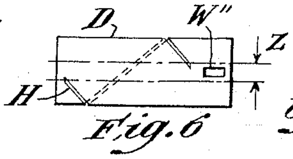

As shown in Fig. 5 the window W' may be located at the end of the longitudinal zone Z in which helical window H terminates, and may be coextensive with the width of the zone Z. If desired, a window W'' may be provided which is less in width than the zone Z, as shown in Fig. 6.

The initial facsimile signal 4*a* generated by the scanner and appearing at its output terminal *a* is applied through a connection Y to the input *a'* of a signal amplifier. Although the signal amplifier may be associated with a remote recorder, in which case the connection Y may include preliminary amplifying and transmitting stages, preferably the signal amplifier is connected directly to the scanner. The circuit includes a signal shaping and amplifying channel 1 and a sync pulse clipping and amplifying channel 2 and 3. Channel 1 squares and amplifies the picture signals *s* as described above and produces the signal 4*d* at its output terminal *d*. A portion of the sync clipper is separated from the facsimile signals by the sync clipper 2 and appears as a low amplitude pulse *p* at the output terminal *b* of the sync clipper. The sync pulse is peaked and amplified in the amplifier 3 as indicated by the voltage 4*c* appearing at the output terminal *c*. The amplified signals *s'* and sync pulse *p'* are combined in a mixer 4, the sync pulse *p'* being inverted in phase and appearing as a blacker than black pulse in the amplified facsimile signal 4*e* at the output terminal *e*.

In Fig. 3 is shown a novel circuit for performing the functions of the two channels. The signal shaping and amplifying channel comprises tubes V1 and V5 to V9. The facsimile signals are first applied to a diode V1 whose cathode is positively biased by voltage dividing resistors 11 and 12 connected between the plate supply B+ and ground so that the diode V1 passes only signals above a level designated Cut Off Of V1 as indicated at 4*a* of Fig. 4. The clipping action of the diode V1 squares the portions of the picture signals *s* approaching the white level. The clipped signals are coupled by a condenser 13 to the grid of an inverter amplifier V6. The white level of the signals is clamped to ground by a diode V5. The cathode of the amplifier V6 is held slightly positive by a dropping resistor 15 and a potentiometer 16 connected between the B+ supply and ground so that the amplifier V6 conducts when a signal slightly above the white level is applied to its grid. The inverted signal output at the plate of amplifier V6 is coupled through a condenser 17 to the grid of a further amplifying and inverting stage V8, whose grid is held at ground by the clamping diode V7. The output of the second amplifier V8 which is of the same polarity as the signal of the input signal *a* is coupled through a condenser 17 and resistor 18 to the picture signal output terminal *d*. This output signal comprises shaped picture signals *s'* and a sync pulse trough *pv*. The presence of signals is indicated visually by a glow lamp I. The amplitude of this signal is established at approximately one volt by the resistor network comprising resistor 18 and 19, the D.C. level being maintained constant by another clamping diode V9.

In the second channel comprising tubes V2 and V3 the first tube V2 is a clipping diode whose plate is held at a positive potential by resistors 21 and 22 and potentiometer 23. The potentiometer 23 is adjusted so that the plate potential is effectively less than that of the picture signals *s* so that the highly positive picture signals will drive the cathode of the diode V2 positive with respect to its plate and render it non-conducting. However, a portion of the sync pulse below the plate potential, labeled Cut Off Of Sync Clipper in 4*a* of Fig. 4, will be passed by the clipping diode V2 to terminal *b*, at which the voltage 4*b* appears. This voltage is applied through a coupling condenser 24 to the grid of the pulse amplifier V3, which grid is held slightly positive by a resistor 26 connected to the B+ supply, so as to remove any vestigial picture signals which may have been passed by the clipping diode V2. The output of the amplifier V3 is peaked by a resistor capacitor network comprising resistor 27 and capacitor 28 and applied to the terminals *c*.

Two triodes V4 and V10, which are connected as cathode followers with a common cathode resistor 31, combine the picture signal output at terminal *d* and the clipped and amplified sync pulse *p'* appearing at terminal *c*. These signals are fed to the grids of the cathode followers V10 and V4 respectively. The combined amplified signals and pulse 4*e* developed across the cathode resistor 31 appear at terminal *e*.

If the picture signals should be delayed by the picture signal channel 1 as indicated at *sd* of voltage 4*f* in Fig. 4, the amplified sync pulse *p'* may be applied to the grid of cathode follower V4 through a time delay circuit F, as is indicated by switch S1. The time delay F may comprise any one of a number of well known pulse delay circuits having a control X for varying the period of delay. The control X is adjusted so that the delayed pulse *pd* is superimposed in the sync pulse trough *pv* thereby occupying the same time relation to the delayed picture signals *sd* as the original sync pulse *p* did to the picture signals *s*. While a time delay circuit is given as one example of a way in which the sync pulse may be reformed separately from the picture signals, it should be understood that other circuits such as peaking circuits, modulators or squarers may be substituted for the time delay circuit F.

It should be further understood that the present disclosure is for the purpose of illustration only and that this invention includes all modifications and equivalents which fall within the scope of the appended claims.

I claim:

1. An electronic circuit for amplifying facsimile signals including a black portion and a white sync pulse, comprising an input terminal for said signals, a channel connected to said terminal including an amplifier of said signals, a second channel connected to said terminal including a stage responsive to the sync pulse only and an amplifier of said sync pulse, and a signal mixer connected to both channels for combining the amplified pulse in black phase with said amplified signals whereby a black sync pulse greater in amplitude than said black portion may be produced.

2. An electronic circuit for amplifying facsimile signals including a black portion and a white sync pulse, comprising an input terminal for said signals, a channel connected to said signals, a second channel connected to said terminal including a clipper and amplifier of said sync pulse, said second channel inverting the sync pulse with respect to the signals, and a signal mixer connected to both channels for combining an amplified pulse in black phase with said amplified signals whereby a black sync pulse greater in amplitude than said black portion may be produced.

3. Apparatus for producing facsimile signals comprising a generator of signals including a black portion and a white sync pulse, and input terminal for said signals, a channel connected to said terminal including amplifier of said signals, a second channel connected to said terminal including a stage responsive to the sync pulse only and means modifying a characteristic of said sync pulse, and a signal mixer connected to both channels for combining the amplified pulse in black phase with said amplified signals, whereby a black sync pulse greater in amplitude than said black portion may be produced.

4. Apparatus for producing facsimile signals comprising a generator of signals including a black portion and a white sync pulse, and input terminal for said signals, a channel connected to said terminal including amplifier of said signals, a second channel connected to said terminal including a stage responsive to the sync pulse only and means for delaying said sync pulse, and a signal connected to both channels for combining the amplified pulse in black phase with said amplified signals, whereby a black sync pulse greater in amplitude than said black portion may be produced.

5. An electronic circuit for amplifying facsimile signals including a black picture portion and a white sync pulse, comprising an input terminal for said signals, a channel connected to said terminal including a shaper and amplifier of said signals, a second channel connected to said terminal including a clipper and amplifier of said sync pulse, and a signal mixer connected to both channels for combining the amplified pulse in black phase with said amplified signals whereby a black sync pulse greater in amplitude than said black picture portion may be produced.

6. Apparatus for producing facsimile signals comprising a generator of signals including means forming a black signal portion and a white sync pulse, an input terminal for said signals, a channel connected to said terminal including amplifier of said signals, a second channel connected to said terminal including a stage responsive to the sync pulse only and an amplifier of said sync pulse, and a signal mixer connected to both channels for combining the amplified pulse in black phase with said amplified signals, whereby a black sync pulse greater in amplitude than said black portion may be produced.

7. Apparatus for producing facsimile signals comprising a light modulated, photoelectric scanner including a drum having a helical window passing light generating black picture signals, the ends of said helical window terminating in a common longitudinal zone of the drum, and a second window of greater width than said helical window and located at least in part in said zone, said window passing increased light generating a whiter than white sync pulse intermediate said picture signals, and an input terminal for said signals and pulse, a channel connected to said terminal including amplifier of said signals, a second channel connected to said terminal including a stage responsive to the sync pulse only and an amplifier of said sync pulse, and a signal mixer connected to both channels for combining the amplified pulse in black phase with said amplified signals, whereby a black sync pulse greater in amplitude than said black picture portion may be produced.

8. In a facsimile scanner of the type described, a drum having a helical window of predetermined width whose ends terminate in a common longitudinal zone of the drum, and a second window of greater width than said helical window and located at least in part in said zone.

References Cited in the file of this patent

UNITED STATES PATENTS

| | | |
|---|---|---|
| 1,824,635 | Stocker | Sept. 22, 1931 |
| 1,859,828 | Jenkins | May 24, 1932 |
| 1,862,455 | Barnecut | June 7, 1932 |
| 2,150,239 | Nichols | Mar. 14, 1939 |
| 2,173,496 | Schlesinger | Sept. 19, 1939 |
| 2,182,000 | Nichols | Dec. 5, 1939 |
| 2,200,009 | Nutall | May 7, 1940 |
| 2,217,396 | Andrieu | Oct. 8, 1940 |
| 2,227,109 | Shankweiler | Dec. 31, 1940 |
| 2,269,590 | Lewis | Jan. 13, 1942 |
| 2,307,387 | Blumlein | Jan. 5, 1943 |
| 2,485,310 | Patremio | Oct. 18, 1948 |
| 2,632,810 | Nyman | Mar. 24, 1953 |